United States Patent [19]
Fillet

[11] Patent Number: 5,797,980
[45] Date of Patent: Aug. 25, 1998

[54] PROCESS AND INSTALLATION FOR THE TREATMENT OF ATOMOSPHERIC AIR

[75] Inventor: Frédéric Fillet, Clamart, France

[73] Assignee: L'Air Liquide, Societe Anonyme pour l'Etude et l'Exploitation des Procedes Georges Claude, Paris Cedex, France

[21] Appl. No.: 827,378

[22] Filed: Mar. 27, 1997

[30] Foreign Application Priority Data

Mar. 27, 1996 [FR] France ................... 96 03808

[51] Int. Cl.$^6$ .................................................. B01D 53/047
[52] U.S. Cl. .............. 95/106; 55/DIG. 17; 95/115; 95/120; 95/123; 95/126; 96/126; 96/127; 96/128
[58] Field of Search .................. 95/96, 106, 114, 95/115, 117, 118, 120, 123, 126; 55/DIG. 17; 96/126, 127, 128

[56] References Cited

U.S. PATENT DOCUMENTS

| | | |
|---|---|---|
| 2,955,673 | 10/1960 | Kennedy et al. ............ 55/DIG. 17 |
| 3,148,040 | 9/1964 | Kern, Jr. ............ 95/120 |
| 3,226,948 | 1/1966 | Alderson et al. ............ 55/DIG. 17 |
| 3,785,755 | 1/1974 | Novak et al. ............ 55/DIG. 17 |
| 3,820,350 | 6/1974 | Brandin et al. ............ 62/193 |
| 3,891,410 | 6/1975 | Hankison ............ 96/126 |
| 4,324,565 | 4/1982 | Benkmann ............ 95/114 |
| 4,437,813 | 3/1984 | Ingram ............ 55/DIG. 17 |
| 4,898,599 | 2/1990 | Settlemeyer ............ 95/126 |
| 5,087,178 | 2/1992 | Wells ............ 95/123 |
| 5,137,548 | 8/1992 | Grenier et al. ............ 95/123 |
| 5,453,112 | 9/1995 | Sinicropi et al. ............ 96/128 |
| 5,487,769 | 1/1996 | Hutchinson et al. ............ 55/DIG. 17 |

FOREIGN PATENT DOCUMENTS

| | | |
|---|---|---|
| 0 330 555 | 8/1989 | European Pat. Off. . |
| 2277462 | 11/1994 | United Kingdom ............ 55/DIG. 17 |

*Primary Examiner*—Duane S. Smith
*Attorney, Agent, or Firm*—Young & Thompson

[57] ABSTRACT

An air compressor (1) is cooled by a water circuit (5) which comprises a buffer tank (6) and an air cooled cooler (7) provided with a fan (8) of adjustable speed. The buffer tank is supplied by makeup water and includes a purge (16) which serves, when the ambient temperature is relatively high, to cool the preliminarily separated compressed air from cooling water. Application in processes for separation of air by adsorption or permeation.

13 Claims, 1 Drawing Sheet

PROCESS AND INSTALLATION FOR THE TREATMENT OF ATOMOSPHERIC AIR

FIELD OF THE INVENTION

The present invention relates to a process for treatment of atmospheric air, of the type in which:

atmospheric air is compressed by means of a compressor cooled by a liquid of which at least a fraction of the flow leaves the compressor in admixture with the compressed air;

the air is separated from the cooling liquid, the liquid from this separation is cooled, and is recycled to the compressor; and the air from the separation is sent to at least one further treatment step.

The invention is applicable in particular to processes for the separation of air by adsorption or by permeation.

BACKGROUND OF THE INVENTION

In these applications, the air compressors are most often compressors of the oil lubricated twin screw type. The oil has a three-fold function: lubricating the bearings of the screws, sealing between the two screws and between themselves and the compressor casing, and cooling the air in the course of compressor.

The presence of the oil in direct contact with the air is advantageous from an energy point of view, because it maintains the air under conditions near isothermal conditions. However, the separation of the air and the oil leaving the compressor is relatively costly to carry out, and the separation of the oil and the water condensed in the course of compression is very difficult whilst being necessary to protect the environment.

OBJECT OF THE INVENTION

The invention has for its object to permit using the cooling liquid of the compressor not only to avoid the above problems, but also to permit obtaining for the air from said separation a desired temperature for its further treatment, particularly in the framework of small units for the separation of air by adsorption with Pressure Swing Adsorption or PSA, or by select permeation.

SUMMARY OF THE INVENTION

To this end, the invention provides a process of the mentioned type, characterized in that:

water is used as the liquid;

the water from said separation is passed through a buffer tank;

this buffer tank is supplied with makeup water to maintain at least a predetermined level; and there is withdrawn from the buffer tank a purge flow which is used, at least for certain values of ambient temperature, to cool the air from said separation.

The process according to the invention can comprise one or several of the following characteristics:

at least one portion of the makeup water is taken from an external source of water;

at at least certain times, said purge flow is completed with a supplemental flow from the external water source;

at least a portion of the makeup water is supplied from a condensation carried out in the course of a further treatment step;

the purge flow is vaporized, and if desired supplemented with a complementary water flow, in a residual gas flow which is not saturated with water, from a final treatment step, and this gas current is placed in heat exchange relation with the air from said separation;

the water from said separation is cooled by means of an adjustable air flow.

The invention also provides an installation for the treatment of atmospheric air adapted to the practice of such a process. This installation, of the type comprising:

an atmospheric air compressor cooled by a liquid which circulates through it in direct contact with the air;

separation means for the air and the liquid are provided at the outlet of the compressor;

a reflux loop of the liquid moving toward the compressor, this loop comprising a refrigeration device; and an intermediate conduit conveying the air which leaves the separation means towards at least one further treatment apparatus, is characterized in that:

said liquid is water; and the loop comprises a buffer container provided with a makeup water supply conduit and a purge conduit connected to a cooling device for air provided on said intermediate conduit.

BRIEF DESCRIPTION OF THE DRAWING

Examples of an embodiment of the invention will now be described with respect to the accompanying drawing, in which.

DETAILED DESCRIPTION OF THE INVENTION

Figure 1:
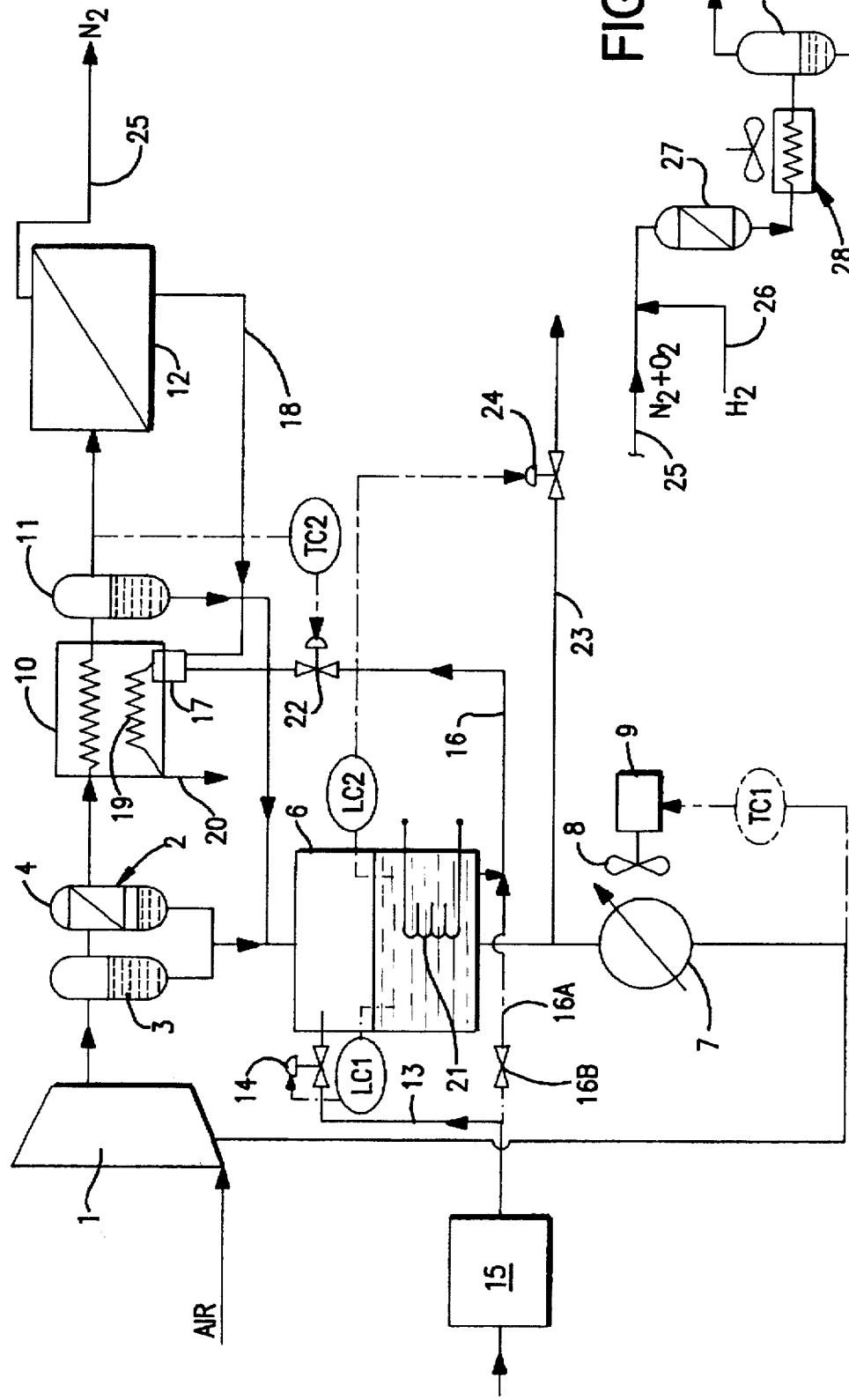
FIG. 1 shows schematically an installation for the production of nitrogen by selective permeation according to the invention.

The installation shown in FIG. 1 comprises essentially: an air compressor 1, which can be of the screw type (that is, the rotary piston type), the ROOTS type or of the liquid ring type; an air-water separation apparatus 2, comprising a phase separator 3 followed by a condenser 4; a recycle loop for water collected at 3 and at 4, this loop comprising in series a buffer tank 6 and a air cooled cooler 7 whose fan 8 is actuated by a motor 9 of adjustable speed; an indirect countercurrent heat exchanger 10; a second phase separator 11; and a permeator 12 adapted to let pass nitrogen and to retain oxygen from the air.

The buffer tank 6 is provided with a supply conduit 13 provided with a valve 14 and connected to an external source of water, for example the mains, via a device 15 for purifying the water from mineral salts and bacteria. This device 15 can be of the ion exchange type. The valve 14 is controlled by a level detector LC1 so as to open as soon as a predetermined low level is reached in the buffer tank 6.

The buffer tank 6 is also provided with a purge conduit 16 which opens from its bottom and leads to an injector 17 disposed at the cold end of the exchanger 10. A conduit 18 connects the permeate outlet of the permeator 12 to the injector 17, and the resulting mixture is sent through the passages 19 for frigorific fluid of the exchanger before being discharged to the atmosphere at 20.

The buffer tank 6 is also provided with an electrical resistance 21 for heating the water contained in the buffer tank.

A first temperature detector TC1 controls the speed of the motor 9 as a function of the temperature of the water which leaves the air cooled cooler 7. Moreover, the purge conduit 16 is provided with a valve 22, which is controlled by a second temperature detector TC2 which continuously measures the temperature of the air entering the permeator 12.

To the conduit which connects the bottom of the buffer tank 6 to the air cooled cooler 7 is connected an overflow conduit 23 provided with a valve 24. This latter is controlled by a second level detector LC2, which opens it when a predetermined high level is reached in the buffer tank.

Nitrogen constituting the retentate of the permeator 12 is evacuated from the installation via a product conduit 25.

In operation, it is desirable that the permeator treat air at a moderate temperature, typically of the order of 15° to 30° C. There will be taken as an example a nominal temperature TC of 25° C., and it will be supposed that the air and the water leave the compressor at the same temperature.

The compression of the air in 1 heats the water whose value $\Delta T$ is known, for example 11° C. So that the air leaves the compressor at 25° C., it is therefore necessary that the water enters it at T1=25° C.$-\Delta T$=14° C.

When the motor 9 turns at maximum speed, the water leaves the cooler 7 at a temperature of about TA+2° C., wherein TA is the ambient temperature.

Two cases are therefore to be distinguished.

(1) TA$\leq$TC$-\Delta T-2$° C. (in which TA$\leq$12° C. in the example in question).

In this case, the cooler 7 can remove all the heat of compression. Thus, it can supply to the compressor water at TA+2° C., which corresponds to a compressed air temperature TA+2° C.$+\Delta T$, which value hypothetically is lower than or equal to TC. The speed of the motor 9 can thus be regulated to obtain compressed air at TC=25° C.

Under these circumstances, the detector TC2 maintains closed the valve 22, and the water circulates in the loop 5, from the apparatus 2 to the buffer tank 6, from the latter to the cooler 7, and thence to the compressor 1. Because of the condensation of atmospheric moisture and the recovery in the buffer tank of the water condensed in 2 and in 11, the level has a tendency to rise in the buffer tank. Thereupon, the detector LC1 maintains closed the valve 14, and the valve 24 opens intermittently, under the control of the detector LC2, when the predetermined high level is reached in the buffer tank 6. This ensures periodic purge of this latter.

When the ambient temperature is very low, for example less than 5° C., and the compressor operates in idle mode, the resistance 21 is turned on to stabilize the temperature of the water at +5° C., so as to avoid any risk of the formation of ice.

(2) TA>TC$-\Delta T-2$° C. (in which TA>12° C. in the example in question).

In this case, the cooler 7 can no longer sufficiently lower the temperature of the recycled water to permit obtaining directly the temperature TC at the outlet of the compressor.

The air which leaves the exchanger 10 hence exceeds the temperature TC, which, under the action of the detector TC2, gives rise to opening of the valve 22. Purge water from the buffer tank 6, passing through conduit 16, is thus vaporized in 17 in the air enriched in oxygen, constituting the permeate of the permeator 12, which is conveyed by the conduit 18. This vaporization lowers the temperature of the residual gas, which becomes a cooling fluid circulating in the exchanger 10 countercurrent to the compressed air. In this way, it is possible to bring the temperature of the air which enters the permeator, to the nominal value TC.

In this embodiment, according to atmospheric moisture, the level can rise or fall in the buffer tank 6. It is maintained between these high and low predetermined values under the action of the detectors LC1 and LC2.

Computation shows that the exchanger 10 can cause the temperature of the air to fall by about 13° C. As a result, the compressed air leaving the compressor can have a temperature up to TC+13° C.=38° C. Given the performances of the cooler 7 indicated above, the temperature TC can thus be obtained at an ambient temperature of 38° C.$-\Delta T-2$° C.=38$-$11$-$2=25° C.

It will be seen that the optimum operation of the permeator can be maintained at any ambient temperature lower than or equal to 25° C., without the need for other heat exchangers nor cooling means.

It is to be noted that thanks to the presence of the conduit 13 for makeup water, the water flow injected at 17 or drawn off by the overflow conduit 23 is independent of the atmospheric air humidity, and can in particular be sufficient to maintain a desired quality of the water which supplies the compressor, as to its content in mineral salts as also as to its bacteriological composition.

As a modification, the exchanger 10 can be replaced by an air cooled cooler in which the purge water is sprayed.

Moreover, as shown in broken lines in FIG. 1, a conduit 16A provided a valve 16B can if desired connect directly the water purification device 15 to the conduit 16, to supply supplemental cold water at the beginning of purging.

Figure 2:
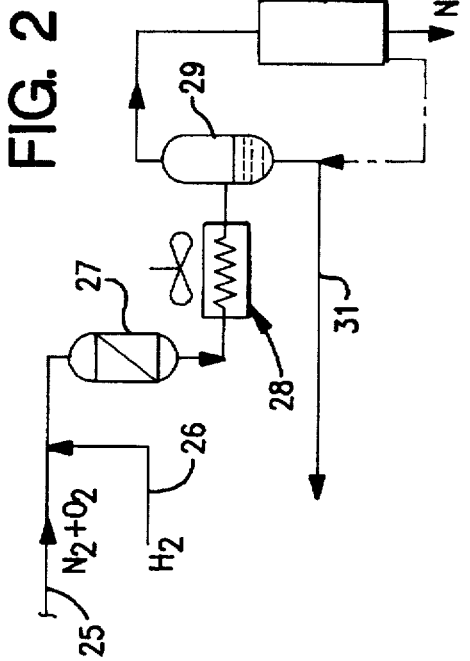
FIG. 2 is a fragmentary sketch of a modification.

In the modification of FIG. 2, the conduit 25 for production of nitrogen leads to a purification means and more particularly means for the elimination of residual oxygen, which is present in a proportional typically of the order of several percent. This equipment comprises a conduit 26 for the injection of hydrogen, a catalytic chamber 27 in which takes place the reaction $H_2+\frac{1}{2}O_2=H_2O$, an air cooled cooler 28, a separator vat 29 and a dryer 30. The water collected at 29 and if desired at 30 is returned to the conduit 13 for makeup water via a conduit 31. If the corresponding water flow rate is sufficient, the connection of the conduit 13 to an external source such as the mains can be omitted.

What is claimed is:

1. In a process for the treatment of atmospheric air, comprising the steps of compressing atmospheric air by means of a compressor cooled by a liquid of which at least a fraction of the liquid leaves the compressor in admixture with the compressed air, separating the compressed air from the cooling liquid, cooling the liquid thus separated, recycling the separated liquid toward the compressor, and sending the thus-separated air to at least one further treatment step; the improvement comprising using water as said liquid, passing the water from said separation to a buffer tank, supplying said buffer tank with makeup water to maintain in said buffer tank at least a predetermined level, withdrawing from the buffer tank a purge flow of water, and using said purge flow of water to cool the air from said separation.

2. Process according to claim 1, wherein at least a portion of the makeup water is taken from an external water source.

3. Process according to claim 1, wherein said purge flow is supplemented by a flow from said external water source.

4. Process according to claim 1, and supplying at least a portion of the makeup water from condensation that results from said at least one further treatment step.

5. Process according to claim 1, and vaporizing said purge flow in a current of residual gas that is not saturated in water, said current of residual gas coming from said further treatment step, and placing said current of gas in heat exchange relation with the air from said separation.

6. Process according to claim 1, wherein water from said separation is cooled by means of an adjustable air flow.

7. In an apparatus for the treatment of atmospheric air, comprising an atmospheric air compressor cooled by a liquid which circulates in direct contact with the air, means for separation of the air and the liquid at the outlet of the compressor, a recycling loop for sending water to the compressor, said loop comprising a cooling device, and an intermediate conduit conveying air which extends from said separation means to at least one further treatment apparatus; the improvement wherein said liquid is water, and said loop comprises a buffer tank provided with a conduit for makeup water supply and a purge conduit connected to a device for cooling air provided on said intermediate conduit.

8. Apparatus according to claim 7, wherein the supply conduit for makeup water is connected to an external water source.

9. Apparatus according to claim 7, wherein the source of external water can be selectively connected (by 16A) to the purge conduit (16).

10. Installation according to claim 7, wherein an apparatus for further treatment comprises condensation means, and in that said condensation means is provided with a return conduit for water thus condensed in the conduit for supplying makeup water.

11. Apparatus according to claim 7, wherein said air cooling device comprises means for mixing water carried by the purge conduit with a residual gas that is not saturated in water, coming from a further treatment apparatus, and a heat exchanger to place this residual gas in heat exchange relation with air from said separation means.

12. Apparatus according to claim 7, wherein said cooling device comprises an air cooled cooler provided with a fan with adjustable speed.

13. Apparatus according to claim 7, wherein the compressor is a screw compressor or a rotary piston compressor or a liquid ring compressor.

* * * * *